United States Patent [19]

Koves

[11] Patent Number: 4,938,422
[45] Date of Patent: Jul. 3, 1990

[54] INLET DISTRIBUTOR FOR DOWNFLOW REACTOR

[75] Inventor: William J. Koves, Hoffman Estates, Ill.

[73] Assignee: UOP, Des Plaines, Ill.

[21] Appl. No.: 138,224

[22] Filed: Dec. 23, 1987

[51] Int. Cl.$^5$ ............................................. B05B 1/14
[52] U.S. Cl. .................................. 239/553.5; 239/559
[58] Field of Search ........................... 239/553–553.5, 239/554, 556, 558, 559

[56] References Cited

U.S. PATENT DOCUMENTS

| | | | |
|---|---|---|---|
| 2,321,431 | 6/1943 | Somes | 239/553.5 |
| 2,359,690 | 10/1944 | Tarbox | 239/553.5 |
| 2,874,001 | 2/1959 | Webb | 239/553.3 X |
| 2,925,331 | 2/1960 | Kazmierczak et al. | 23/288 |
| 3,229,913 | 1/1966 | Waldrum | 239/556 X |
| 3,479,146 | 11/1969 | Hochman et al. | 239/553.5 X |
| 3,598,541 | 8/1971 | Hennemuth | 23/288 |
| 3,598,542 | 8/1971 | Carson et al. | 23/288 |

FOREIGN PATENT DOCUMENTS 641697 4/1928 France ................................. 239/556

Primary Examiner—Andres Kashnikow
Assistant Examiner—William Grant
Attorney, Agent, or Firm—Thomas K. McBride; John G. Tolomei

[57] ABSTRACT

An inlet distributor for a gas solids contracting vessel uses a two direction distributor to prevent bed surface disturbances at high inlet velocities and high particle loadings. The distributor uses a series of partitions to peel off portions of the downward gas flow and redirect them radially outward. Each outwardly directed gas flow component passes through a series of perforations to effect any necessary circumferential redistribution before entering the space above the particle bed. By subdividing the gas flow into a number of radially directed flow portions and circumferentially redistributing these flow portions, cross-currents and eddy currents on the catalyst bed surface are minimized or avoided so that disturbances at the bed surface are eliminated. This distributor is particularly effective in vessels having particles loaded to within a short distance of bed inlets and where elbows or other upstream flow devices introduce nonuniformities into the gas flow to a particle bed. The distributor has a simple arrangement and can be used without adding significant pressure drop to the system.

14 Claims, 2 Drawing Sheets

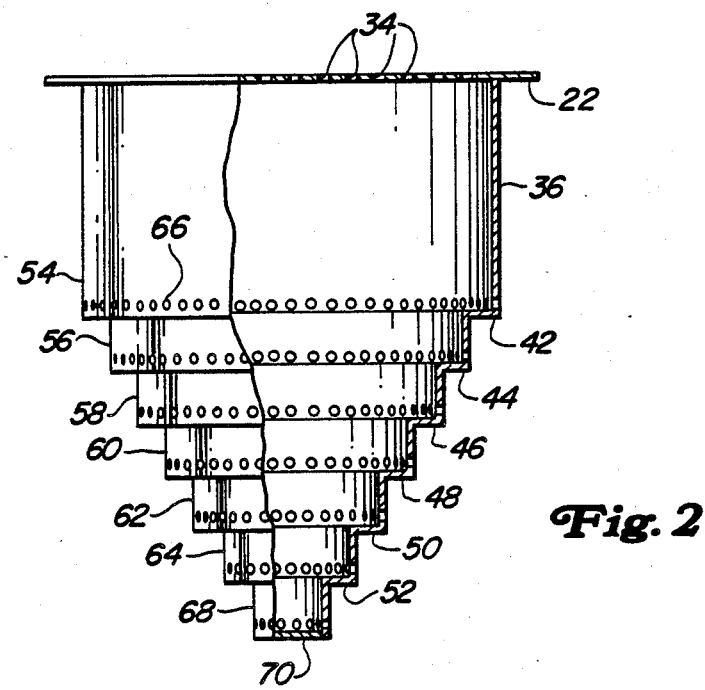
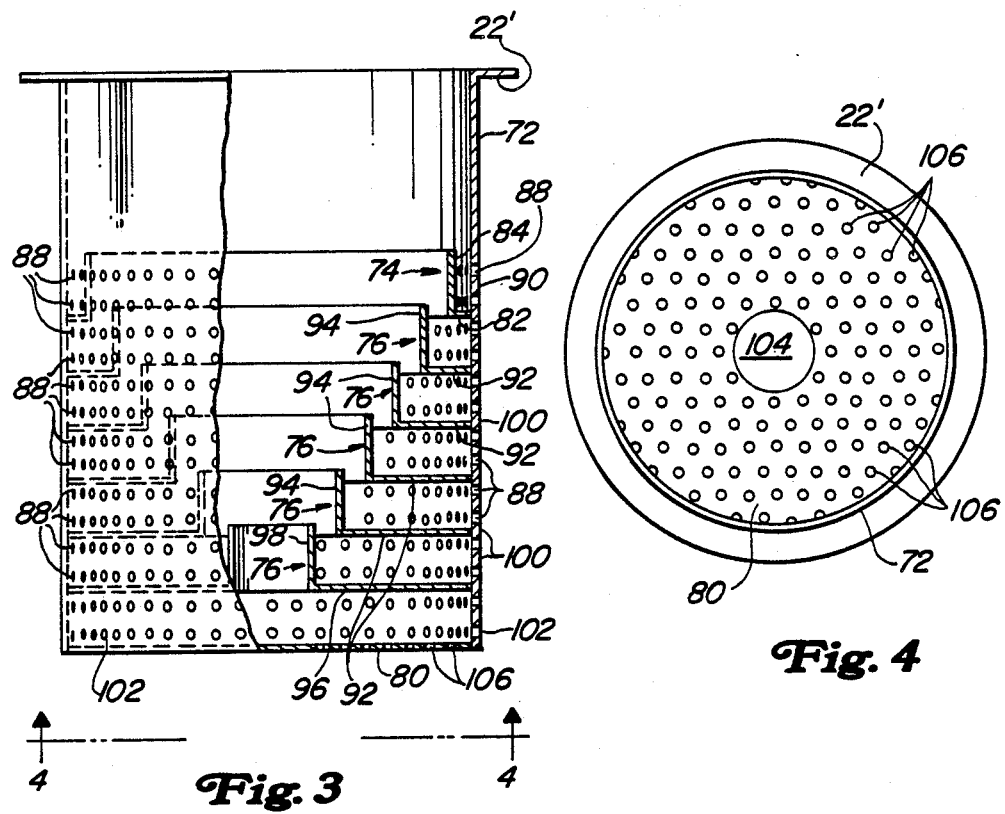

INLET DISTRIBUTOR FOR DOWNFLOW REACTOR

BACKGROUND OF THE INVENTION

This invention relates generally to the field of fluid-solid contacting. More specifically, this invention deals with the delivery of fluids to beds of particulate material.

Fluid-solid contacting devices have a wide variety of applications. Such devices find common application in processes for hydrocarbon conversion and adsorption columns for separation of fluid components. When the fluid-solid contacting device is an adsorption column, the particulate material will comprise an adsorbent through which the fluid passes. In the case of hydrocarbon conversion, the fluid-solid contacting apparatus is typically a reactor containing catalyst. Typical hydrocarbon conversion reactions that may be carried out are hydrogenation, hydrotreating, hydrocracking, and hydrodealkylation.

Fluid-solid contacting devices to which this invention apply are arranged as an elongated cylinder usually having a vertical orientation through which an essentially vertical flow of fluid is maintained. Particulate material contained in this vessel is arranged in one or more beds. Fluid enters the vessel through an inlet located at an upstream end of the vessel. It is also commonly known to add or withdraw fluid from between the particulate beds. This is commonly done in adsorption schemes where the composition of the fluid passing between particle beds is changing or in hydrocarbon conversion processes where a quench system is used to cool fluid as it passes between beds.

Changes in the composition or properties of the fluid passing through the particular zone present little problem provided these changes occur uniformly. In adsorption systems these changes are the result of retention or displacement of fluids within the adsorbent. For reaction systems changes in temperature as well as composition of the fluid are caused by the particulate catalyst material contained in the beds.

Nonuniform flow of fluid through these beds can be caused by poor initial mixing of the fluid entering the bed or variations in flow resistance across the particulate bed. Variations in the flow resistance across the bed can vary contact time of the fluid within the particles thereby resulting in uneven reactions or adsorption of the fluid stream passing through the bed. In extreme instances, this is referred to as channeling wherein fluid over a limited portion of the bed is allowed to move in a narrow open area with virtually no resistance to flow. When channeling occurs, a portion of the fluid passing through the bed will have minimal contact with the particulate matter of the bed. If the process is one of adsorption, the fluid passing through the channel area will not be absorbed, thereby altering the composition of this fluid with respect to fluid passing through other portions of the absorbent bed. For a catalytic reaction, the reduction in catalyst contact time will also alter the product composition of fluid as it leaves different portions of the catalyst bed.

In addition to problems of fluid composition, irregularities in the particulate bed can also affect the density and temperature of the fluid passing through the bed. For many separation processes retained and displaced components of the fluid have different densities which tend to disrupt the flow profile through the bed. Nonuniform contacting with the adsorbent particles will exacerbate the problem by introducing more variation in the density of the fluid across the bed thereby further disrupting the flow profile of the fluid as it passes through the particle bed.

In reaction zones, temperature variations are most often associated with nonuniform catalyst contact due to the endothermic or exothermic nature of such systems. Nonuniform contact with the catalyst will adversely affect the reaction taking place by overheating or overcooling the reactants. This problem is most severe in exothermic reactions where the higher temperature can cause further reaction of feedstock or other fluid components into undesirable products or can introduce local hot spots that will cause damage to the catalyst and/or mechanical components.

Fluid flow into the vessel can disrupt the top surface of the bed. The disruption results from transverse fluid flow across the surface of the bed at velocities sufficient to move the individual bed particles. For a confined bed, this disruption or movement of the particles will cause the particles to abrade against each other generating smaller particles which are referred to as fines. These fines may increase pressure drop within the bed or escape from the bed thereby reducing the overall quantity of particles in the bed and possibly interfering with downstream operations. In unconfined beds, transverse fluid flow may also shift large quantities of particles so that the bed surface is highly irregular.

These transverse currents are the result of charging fluid into a relatively large diameter vessel through a relatively small diameter nozzle. Charging fluid into the vessel through a small diameter nozzle produces a high velocity jet that extends from the nozzle into the vessel. Impact of this jet on or adjacent to the surface of a relatively closed catalyst bed flares the fluid outward thereby producing eddy currents and fluid velocities transverse to the bed surface. The inlet effects associated with the relatively small diameter nozzle are compounded by the usual presence of an elbow just upstream of the nozzle which introduces another transverse velocity component into the fluid flow entering the vessel. The overall result of these inlet effects is often the piling up of particles around the periphery of the particle bed or the shifting of particles from one side of the bed to the other.

These detrimental inlet effects are avoided by uniformly dispersing the fluid as it enters the vessel. Uniform dispersal can be obtained by providing a sufficient length between the nozzle and the catalyst bed surface such that the fluid jet and any transverse velocities are substantially dissipated upstream of the particle bed. However, in most cases, it is impractical to provide the length necessary for dissipation of the inlet effects due to the excessive vessel tangent length that would be required. In fact, the trend in many industries is to decrease the length between the inlet nozzle and the particle bed surface in order to increase the total volume of particles in the vessel and thereby obtain greater fluid throughput or greater particle bed service life.

For these reasons, inlet distributors are commonly used to break up the fluid jet and redistribute fluid flow over the top surface of a particle bed. One such device is shown in U.S. Pat. No. 2,925,331 issued to Kazmierczak et al. where a fluid stream is downwardly directed onto the upper surface of the catalyst bed and passes first through a distributor consisting of a series of annular plates having inner diameters that progressively decrease in the direction of fluid flow so that portions of the fluid stream are in effect peeled off and redirected radially outward over the surface of the particle bed. It is also known in the hydrocarbon processing industry to attach cylindrical rings extending in the direction of fluid flow to the inner edge of the annular plates. Another type of distributor used to redirect and remix fluid flow upstream of a particle bed is shown in U.S. Pat. No. 3,598,541 issued to Hennemuth et al. and U.S. Pat. No. 3,598,542 issued to Carson et al. The Hennemuth distributor uses a series of circumferentially spaced holes to redistribute fluid within a fluid mixing device that communicates with the upper surface of a particle bed. The distributor disclosed in Carson uses a series of circumferentially spaced holes to radially discharge fluid across the upper surface of a particle bed. Thus, the prior art is well acquainted with a number of distribution devices for use in fluid solid contacting vessels.

Despite the use of different inlet distributors, bed disruption remains a problem. Distributors that use the annular plates or baffles of the Kazmierczak device reduce the severity of bed disturbances but have not eliminated it. Therefore, large scale shifting of particle bed surfaces, especially where fluid inlet velocities are high, still occurs. Such disruption is still known to occur even in cases where straightening vanes and other flow distribution devices are added to the upstream elbow as a means of eliminating a resulting transverse flow component. It has now been discovered that despite the presence of the baffles and additional redistribution devices, such as straightening vanes, fluid flow entering the vessel still remembers the change of direction that took place upstream of the inlet nozzle.

SUMMARY OF THE INVENTION

Therefore, it is an object of this invention to improve fluid dispersal over the surface of a particulate bed.

It is a further object of this invention to prevent disruption of the top surface of the bed.

It is a yet further objective of this invention to dissipate inlet effects such as jets and transverse currents associated with fluid flow into a vessel while minimizing the distance between the inlet nozzle and the particle bed surface.

Another object of this invention is to provide a fluid distributor that eliminates transverse velocity components that enter the vessel through a relatively small nozzle.

These and other objects are satisfied by the device of this invention which is the first inlet distributor to radially and circumferentially redirect a majority of an axial fluid flow over the surface of a particle bed. This redistribution dissipates nonuniform transverse velocity components and eddy currents that were not eliminated by other inlet distributors. More specifically, this invention is a fluid distributor that divides a principally axial flow of fluid into a series of flow passages. These flow passages end in cylindrical outlet bands having uniformly spaced apertures about their circumference that provide a small pressure drop for circumferentially redistributing the fluid leaving each passage. The cylindrical bands of apertures are progressively spaced at increasing distances from the inlet nozzle to increase the dispersal of fluid flow over the entire particle bed surface.

Accordingly, in one embodiment, this invention is a fluid distributor comprising a conduit, a plurality of partitions, and a series of perforations. The conduit has an inlet for receiving a fluid stream. The plurality of partitions subdivide most of the cross-sectional area of the conduit into at least two annular collection zones. The partitions also define, at least in part, a series of outlet bands that are centered about the longitudinal axis of the conduit. Each outlet band is located at the end of one collection zone and the outlet bands have an arrangement wherein the outermost collection zone ends with the outlet band located nearest the inlet and each successive inwardly spaced collection zone ends with an outlet band having an increased spacing from the inlet. The series of perforations are spaced at regular intervals about the circumference of each band to circumferentially redistribute fluid flow out of each outlet band.

In another embodiment, this invention is a fluid distributor that comprises a cylindrical container, a plurality of partitions, and aperatures spaced uniformly about the circumference of the container. The cylindrical container has a primary inlet at one end and a closure plate at the opposite end. The plurality of partitions are located in the container and define a series of annular inlets inside the container and a series of cylindrical outlet bands along the wall of the container. The partitions communicate each inlet with one outlet and change the direction of fluid flow between the annular inlets and the outlets. A portion of the apertures lie within each cylindrical outlet band. The apertures are uniformly spaced circumferentially about each outlet band and provide a small pressure drop for circumferentially redistributing fluid flow out of each band.

Additional objects, embodiments, aspects, and details of this invention are set forth in the following detailed description.

BRIEF DESCRIPTION OF THE DRAWINGS

FIG. 2 is one form of the inlet distributor of this invention.

FIG. 3 is an alternate form of the inlet distributor of this invention.

FIG. 4 is a bottom view of the inlet distributor of FIG. 3.

DETAILED DESCRIPTION OF THE INVENTION

Figure 1:
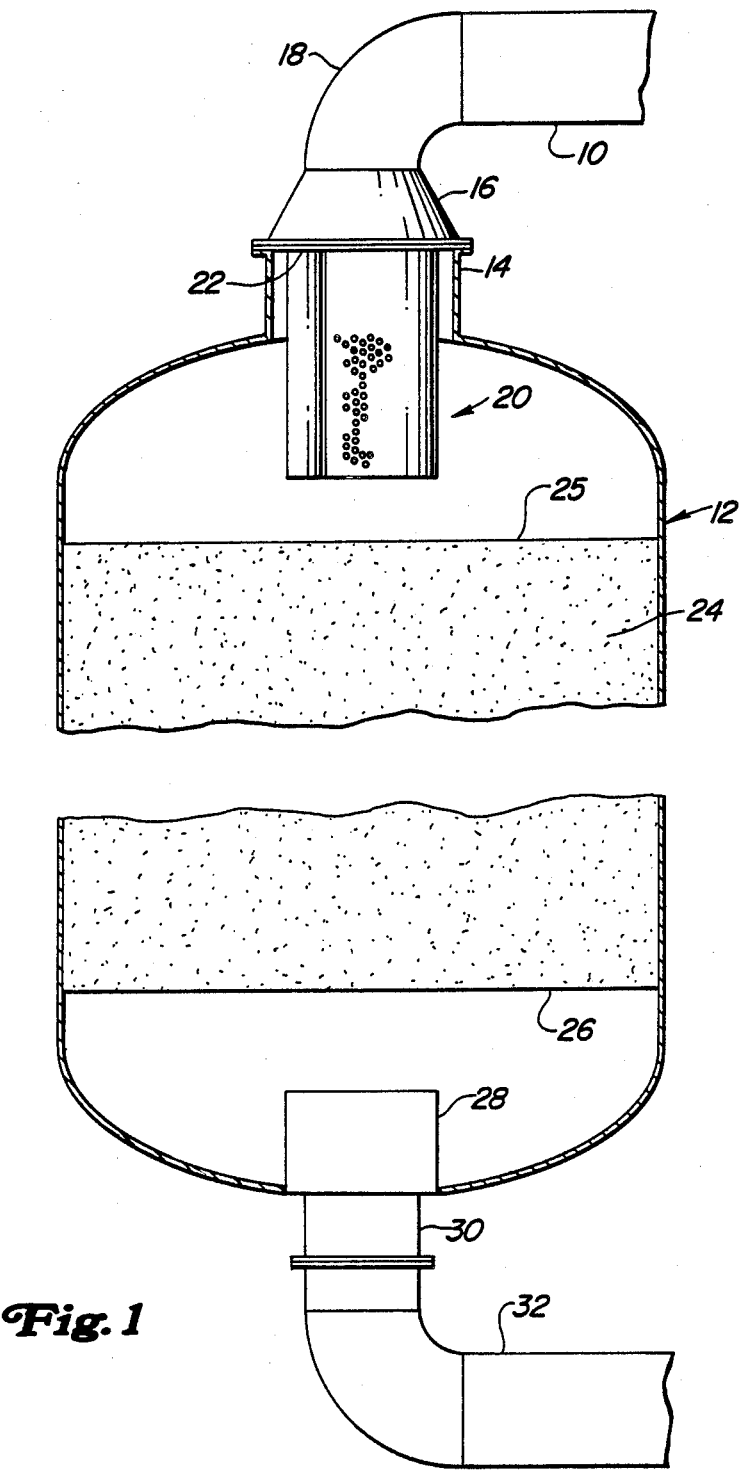
FIG. 1 shows an arrangement of a downflow reactor having an inlet distributor and a particle bed.

The distributor of this invention can be used in conjunction with any particle bed. Typically, the particle bed and inlet distributor will be located inside a vessel for a catalytic reaction or an adsorption process. This invention finds greatest advantage when used with a vessel having a downward flow of fluid from an inlet nozzle through an unconfined bed of particles. The invention can also be used with confined particle beds. In confined particle beds, large scale shifting of the upstream bed surface is not a concern due to restraint by a screen or other confining device but disturbance of the bed surface can still cause attrition and wear of the particles. Thus, while best suited for downflow type vessel, this invention can also be used in vessels where fluid flow is primarily horizontal or even upflow.

Most arrangements for piping fluid to the particle beds will dictate the use of pipe bend or elbow just upstream of the inlet supplying fluid above a particle bed surface. Passage through the bend concentrates fluid flow in the outer radius of the bend. The distributor of this invention is especially effective in preventing the bend effect from contributing to bed disturbances. Bend effects are corrected by circumferentially redistributing the annularly segregated portions of the fluid flow to the particle bed.

Fluid entering the distributor of this invention may be gaseous phase, liquid phase, or a combination of the two. Greatest advantage is obtained when the fluid stream entering through the inlet distributors is in gas phase.

This invention is more fully explained in the context of a typical downflow vessel arrangement as shown in FIG. 1. The remainder of this description refers to the fluid as a gas. This reference is not meant to limit the invention to gas phase flow. Referring again to FIG. 1, an upper pipe 10 delivers a gas phase fluid to a vessel 12 through an inlet nozzle 14 which is connected to pipe 10 through a pipe swedge 16 and an elbow 18. If unrestricted, discharge of the fluid from elbow 18 would produce a gas jet and also introduce a transverse velocity component into the gas stream that enters vessel 12.

However, all of the gas flow that enters vessel 12 is intercepted first by distributor 20. Distributor 20 has an inlet plate 22 sandwiched between the bottom of pipe swedge 16 and the top of inlet nozzle 14. Sandwiching plate 22 between pipe swedge 16 and inlet 14 secures distributor 20 to vessel 12 and provides a seal between pipe swedge 16 and inlet plate 22 that prevents fluid from entering vessel 12 without first passing through distributor 20. Other well-known means of attaching distributor 20 to vessel 12 or pipe swedge 16 can be used. Nevertheless, whatever method of attachment is used, it is important that the method prevent bypassing of fluid around distributor 20 and into the vessel 12. This bypassing can produce concentrated jets of fluid flow that will diminish or defeat the effect of distributor 20.

In a manner hereinafter described, distributor 20 disperses the gas over the cross-section of vessel 12. The dispersed gas enters a particle bed 24 having an upper surface 25. Bed 24 is composed of solid particles which can be in the form of pills, spheres, cylinders, or other extruded shaped. The actual properties of the particles will depend upon the process which is carried out in the containment vessel. Generally, particles will consist of an adsorbent or a catalyst. As a further means of preventing bed disturbances, a layer of support material, usually comprising ceramic balls, may be added and comprise the upper surface of the particle bed. In the case of a downflow reactor, bed surface 25 will simply consist of particles that have been leveled at the time of loading. In the case of a confined catalyst bed, a screen or other layer of laminar material will be at the level of surface 25. As gas passes across upper surface 25, it proceeds down through the remainder of bed 24. Once the gas has moved a short distance past the bed surface, provided the surface remains level, a complete redistribution of the gas is effected such that it will pass uniformly through the remainder of the bed. Therefore, it is not essential that distributor 20 provide a completely uniform distribution of gas across the bed surface 25. The purpose of distributor 20 is to provide a fluid, or in this case gas dispersion, that has enough uniformity to eliminate any eddy or cross-currents having sufficient velocity to disrupt surface 25. After a predetermined contact time, gas leaves the catalyst bed 24 by passing through a porous support member 26. Member 26 can be screen or any other rigid layer of porous material having sufficient strength to support the weight and pressure loading of catalyst bed 24. Exiting gases pass through an outlet screen 28 that collects any fine particles that have passed out of a catalyst bed and through support member 26. From screen 28, exiting gases leave the vessel 12 through an outlet nozzle 30 which is connected to a lower pipe 32.

The function of distributor 20 in dispersing fluid can be more fully appreciated by a consideration of the device shown in FIG. 2 which is one form of a distributor designed in accordance with this invention. FIG. 2 shows inlet plate 22 having a series of perforations 34 which collectively provide an inlet for gas flow into the distributor. Although preferred, it is not necessary that perforations 34 be used across the inlet of plate 22. Inlet plate 22 may be provided with a few large openings or a single opening. The use of perforations increases the uniformity of the gas flow into the distributor the advantage of which must be balanced against an increased pressure drop across the inlet. Therefore, pressure drop considerations will control the number and size of openings in inlet plate 22. In normal practice, the holes in the inlet plate will be sized to provide a pressure drop at least equal to twice the velocity head of the incoming gas stream. The opening or openings may extend as far as the wall of a conduit 36 that receives the gas flow passing through inlet plate 22. A series of partitions 42, 44, 46, 48, 50, and 52 divide the projection of the cross-sectional area of conduit 36 into a series of annular collection zones. A series of outlet bands 54, 56, 58, 60, 62, and 64 are associated respectively with one of the partitions to define the collection zones as that volume lying in both the space above a given partition and the cylindrical space confined by each outlet band. The collection zone associated with partition 42 and outlet 54 takes the outermost annular layer of gas flow passing through conduit 36 and redirects it in a radial direction out of series of apertures 66 located in outlet band 54. Apertures 66, in this case, are simply a series of holes spaced circumferentially about outlet 54 at a uniform spacing. The pressure drop across opening 66 is kept low so that the horizontal velocity component created by the impact of gas flow against partition 42 will be preserved and contribute to the radial momentum of the gas as it leaves the distributor. Holes 66 serve the important function of circumferentially redistributing the gas flow at each partition. Therefore, a completely open outlet band, as practiced in the prior art, does not provide the necessary pressure drop for circumferential redistribution. A minimum pressure drop in excess of the radial velocity head and preferably several times greater than the radial velocity head across the opening 66 will provide the necessary circumferential redistribution. The collection zones associated with the downstream partitions 44, 46, 48, 50, and 52 take the remaining gas flow from annular layers of progressively decreasing diameter and redirects it radially outward. The gas flow deflected by each partition passes through apertures 66 of its respective outlet band which circumferentially redistribute the flow in the manner described.

Fluid that passes below partition 52 enters a final outlet arrangement which, in this case, consists of an outlet band 68 and a bottom plate 70. End plate 70 is usually imperforate. When end plate 70 has a large diameter relative to the bed, small perforations may be provided to direct a small portion of the gas downwardly onto the center of the particle bed to avoid the formation of a dead space below the distributor which could again introduce eddy currents above the bed. However, the majority of the gas flow passing below partition 52 is radially redirected through outlet band 68. Any gas flow permitted through an opening in plate 70 should not exceed the volumetric gas addition that satisfies the average gas flow requirements through the central portion of the bed that is not in the immediate flow path of the radially discharged gas. Gas flow through plate 70 can produce a jet which can impact and disturb the downstream bed surface. Therefore, jet length considerations may limit the size of any opening in plate 70.

The configuration of distributor 20 will vary depending primarily on the geometry of the vessel in which it is inserted and the number and type of collection zones. The length of conduit 36 between inlet plate 22 and the first outlet band is sized to get the apertures 66 below the inlet nozzle 14 so that the radially directed fluid passing therethrough does not impinge on the nozzle wall. The number of collection zones used in a particular distributor will vary with the velocity of gas flow, the relative size of the inlet nozzle and vessel, and the susceptibility, of the particle bed to flow-induced disturbance. Two or more collection zones may be used. Generally, the more collection zones used, the better the distribution across the catalyst beds. In the specific configuration of the FIG. 1 distributor increasing the width of the partitions will increase the radial gas flow at each outlet band. Adjusting the size and number of apertures in each outlet band will also vary the radial gas velocity or through aperatures in different outlet bands. By appropriate sizing of the collection zones and aperatures, this distributor can provide good gas dispersion over a particle bed of almost any shape or size.

An alternate and often preferred arrangement for the distributor of this invention is shown in FIG. 3. In this case, the distributor consists of an inlet plate 22', a cylindrical container 72, an upper partition 74, intermediate partitions 76, a lower partition 78, and an end plate 80. The upper end of container 72 referred to as the inlet or primary inlet is attached to inlet plate 22'. Inlet plate 22' is perforated with a series of equally spaced holes to provide a pressure drop for the gas passing across the inlet plate. Partition 74 consists of an annular plate 82 which is attached along its outer perimeter to the interior of container 72 and a ring 84 which is attached to the inner perimeter of plate 82 and extends upward towards the primary inlet. Ring 84 together with the wall of cylinder 72 defines an annular inlet extending between the top of ring 84 and the cylinder wall which collects gas flow traveling in a principally downward direction along the wall of cylinder 72. The gas flow is redirected radially outward by partition 74 and passes through a series of holes 88 in an outlet band 90. Outlet band 90 is defined as that section of container 72 lying in the radial projection of ring 84. Holes 88 are again sized to provide only a small amount of pressure drop across the outlet band.

Intermediate partitions 76 consists of annular plates 92 having their outer perimeter attached to the inside of container 72 and an inner perimeter to which a ring 94 is attached. The number and size of holes 88 in any outlet band may be adjusted to provide the desired flow rate and to some degree the desired pressure drop at any band level. The velocity head produced at each annular inlet provides additional pressure drop that may be used to adjust and vary the pressure drop at any given band level without upsetting, to any great degree, the overall pressure balance across all the annular inlets. Lower partition 78 consists of an annular plate 96 having its outer perimeter attached to the inside of container 72 and an inner perimeter to which a ring 98 is attached and extends upward towards the primary inlet. Annular plates 82, 92, and 96 divide the portion of container wall 72 located therebetween into a number of vertically spaced outlet bands 100. Annular inlets, defined as the horizontal area between the top of one ring and a superadjacent ring, collect annular sections of axially flowing gas from the region immediately above the annular inlets. The gas collected by the annular inlets is redirected and discharged in a radial direction through a series of holes 88 located in annular bands 100. Holes 88 are uniformly spaced about the circumference of each outlet band. By providing a small pressure drop, holes 88 ensure that radial gas flow from the outlet bands is uniform across the entire circumference. Again, only a small pressure drop through holes 88 is required to provide any needed circumferential redistribution. Rings 94 and 98 extend upward towards the primary inlet and preferably extends above the next adjacent annular plate. Extending the ring above the next adjacent annular plate defines at least a small vertical flow passage between adjacent rings that aids in trapping an annular section of gas flow by preventing inward deflection of the gas as it contacts the partition and undergoes a change in direction. Preferably, the extension of the ring above the next adjacent annular plate equals at least a quarter of the horizontal distance between the adjacent rings.

Gas flow traveling down the very center of cylindrical container 72 passes inside ring 98 and into a chamber bordered by annular plate 96, plate 80, and container 72. A portion of the gas entering this chamber is directed radially outward through holes 102. The remainder of the entering gas passes downwardly through perforations in end plate 80. The arrangement of perforations in end plate 80 is more clearly shown in FIG. 4. End plate 80 is imperforate about a central diameter equal to the inner diameter of ring 98. The remaining area of end plate 80 is perforated by smaller holes 106 that are equally spaced about the plate. The total open area provided by holes 102 and 106 will provide a very small pressure drop through these openings. Small holes 106 are located under annular plate 96 to prevent any direct axial gas flow out of the distributor and preferably sized to provide a gas flow to that portion of the particle bed surface underlying horizontal projection distributor that is at least equal to the average gas flow across the entire particle bed surface. As previously mentioned, providing downward or axial gas flow across the top surface of the bed prevents horizontal gas flow that could disturb the bed.

What is claimed is:

1. A fluid distributor comprising:
   (a) a conduit having an inlet for receiving a fluid stream;
   (b) a plurality of partitions subdividing at least half of the cross-sectional area of said conduit into at least two annular collection zones said partitions having an inner ring that extends longitudinally toward said inlet to a level at least equal to about the most downstream level of the preceding collection zone;
   (c) a series of outlet bands spaced along and centered about the longitudinal axis of said conduit, with each outlet band located along the outer boundary of a collection zone, said outlet bands having an arrangement wherein the outlet band located nearest said inlet borders the outmost collection zone and succeeding outlet bands having an increased axial spacing from said inlet border collection zones have progressively increasing inward locations;

2. The distributor of claim 1 wherein said conduit and said outlet bands have a uniform diameter and comprise a cylindrical vessel having a closure plate at an end opposite said inlet.

3. The distributor of claim 2 wherein said inlet communicates with said closure plate and said closure plate is perforated.

4. The distributor of claim 1 wherein said outlet bands have progressively decreasing diameters with the smallest diameter band located the greatest distance from said inlet.

5. The distributor of claim 1 wherein said partitions comprise annular plates having inner diameters that progressively decrease in size as the distance of the annular plate from said inlet increases and each of said rings extends toward said inlet from the inner diameter of each annular plate past the preceding annular plate.

6. The distributor of claim 1 wherein a perforated plate covers said inlet.

7. A fluid distributor comprising:
(a) a cylindrical container having a primary inlet at one end and a closure plate at the opposite end;
(b) a plurality of partitions located in said container and defining a series of annular inlets inside said container and a series of cylindrical outlet bands along the wall of said container, said partitions collectively communicating each inlet with one outlet and having an arrangement that will change the direction of any fluid flowing between said annular inlets and said outlet bands said partitions having an inner ring that extends longitudinally toward said primary inlet to a level at least equal to about the most downstream level of the preceding collection zone; and
(c) a series of apertures spaced uniformly about the circumference of each outlet band.

8. The distributor of claim 7 wherein said aperatures are uniformly sized and spaced about said cylinder.

9. The distributor of claim 7 wherein said closure end plate contains a plurality of apertures and the farthest partition from said primary inlet has an opening for communicating said primary inlet with said closure end plate.

10. The distributor of claim 7 wherein said partitions comprise annular plates, each plate having its outside circumference fixed to said container and said inner ring is a cylindrical ring fixed to the inside circumference of said annular plate with each ring extending toward said primary inlet and past the preceding annular plate.

11. The distributor of claim 10 wherein at least three partitions are located within said container.

12. The distributor of claim 10 wherein a perforated inlet plate covers said primary inlet.

13. The distributor of claim 12 wherein said end closure plate contains a plurality of apertures and has an imperforate central portion, said central portion having a diameter equal to or greater than the annular opening of the partition farthest from said primary opening.

14. The distributor of claim 12 wherein the perforations in said inlet plate are sized to produce a pressure drop at least equal to twice the velocity head of any fluid entering the distributor.

* * * * *